(12) United States Patent
Petty

(10) Patent No.: US 7,300,569 B2
(45) Date of Patent: Nov. 27, 2007

(54) WATER TREATMENT SYSTEM

(75) Inventor: Bret L. Petty, Avon, IN (US)

(73) Assignee: New Aqua, LLC d/b/a Agua Systems, Avon, IN (US)

( * ) Notice: Subject to any disclaimer, the term of this patent is extended or adjusted under 35 U.S.C. 154(b) by 378 days.

(21) Appl. No.: 10/842,104

(22) Filed: May 10, 2004

(65) Prior Publication Data

US 2005/0247634 A1 Nov. 10, 2005

(51) Int. Cl.
*B01D 15/00* (2006.01)
(52) U.S. Cl. .................. 210/138; 210/143; 210/150; 210/263; 210/269; 210/278
(58) Field of Classification Search ............... 210/138, 210/143, 150, 263, 269, 278
See application file for complete search history.

(56) References Cited

U.S. PATENT DOCUMENTS

| | | | |
|---|---|---|---|
| 2,872,415 A | 2/1959 | Schleyer et al. |
| 3,151,064 A | 9/1964 | Lathrop |
| 3,380,590 A | 4/1968 | Grayson |
| 3,465,881 A | 9/1969 | Rogers |
| 3,482,604 A | 12/1969 | Fleckenstein et al. |
| 3,616,820 A | 11/1971 | Fleckenstein |
| 3,649,532 A | 3/1972 | McLean |
| 3,779,913 A | 12/1973 | Martin |
| 4,136,032 A | 1/1979 | Bakken et al. |
| 4,235,718 A | 11/1980 | Lopez |
| 4,290,451 A | 9/1981 | Fleckenstein et al. |
| 4,313,825 A | 2/1982 | Fleckenstein et al. |
| 4,430,228 A | 2/1984 | Paterson |
| 4,451,361 A | 5/1984 | Paterson |
| 4,659,463 A | 4/1987 | Chandler et al. |
| 4,663,089 A | 5/1987 | Lowry et al. |
| 4,885,084 A | 12/1989 | Doyle |
| 4,966,692 A | 10/1990 | Overy |
| 5,073,310 A | 12/1991 | Ramsey |
| 5,080,805 A | 1/1992 | Houser |
| 5,096,580 A | 3/1992 | Auchincloss |
| 5,096,596 A | 3/1992 | Hellenbrand et al. |
| 5,130,015 A | 7/1992 | Simizu et al. |
| 5,147,530 A | 9/1992 | Chandler et al. |
| 5,618,417 A | 4/1997 | Spindler |
| 5,660,721 A | 8/1997 | Kyriss et al. |
| 5,919,373 A | 7/1999 | Naaktgeboren |
| 6,074,562 A | 6/2000 | Falkner |
| 6,627,070 B1 | 9/2003 | Frank |

FOREIGN PATENT DOCUMENTS

SU 1504226 A 8/1989

OTHER PUBLICATIONS

Microclear® VI Brochure; Water Care; Jun. 1984.

(Continued)

*Primary Examiner*—Chester T. Barry
(74) *Attorney, Agent, or Firm*—Krieg DeVault LLP

(57) ABSTRACT

A water treatment system which includes a control valve with a venturi for drawing air into a tank. The passage of untreated water into the control valve draws air into a tank for oxidation of the water. The flow of the air into the tank is independent of the flow of treated water from the system.

27 Claims, 10 Drawing Sheets

OTHER PUBLICATIONS

Series 9000 Water Treatment System Owners Manual; Aqua Systems; 1984.

MacClean Installation and Operating Instructions; Form D-258 (Rev. Jun. 1984); Chemical Engineering Corporation.

ATS Chemical Free Air Pump Systems Series 2510 Series 2510ET; Form FN96-140; ATS; 1998.

Fleck Literature; Model 3600 Service Manual; 1990.

Fleck Literature; Model 5600 Water Conditioner Control; Nov. 1982.

Fleck Literature; Model 5600EM Electronic Econominder; Aug. 1983.

Fleck Literature; Installation and Start-Up Procedure for the Water Softener Control; 1973.

Letter from William E. Noonan; May 23, 2006.

Iron Curtain System™ Installation and Operation Manual for systems manufactured after Oct. 1997, Hellenbrand Water Conditioners, Inc., Waunakee, WI.

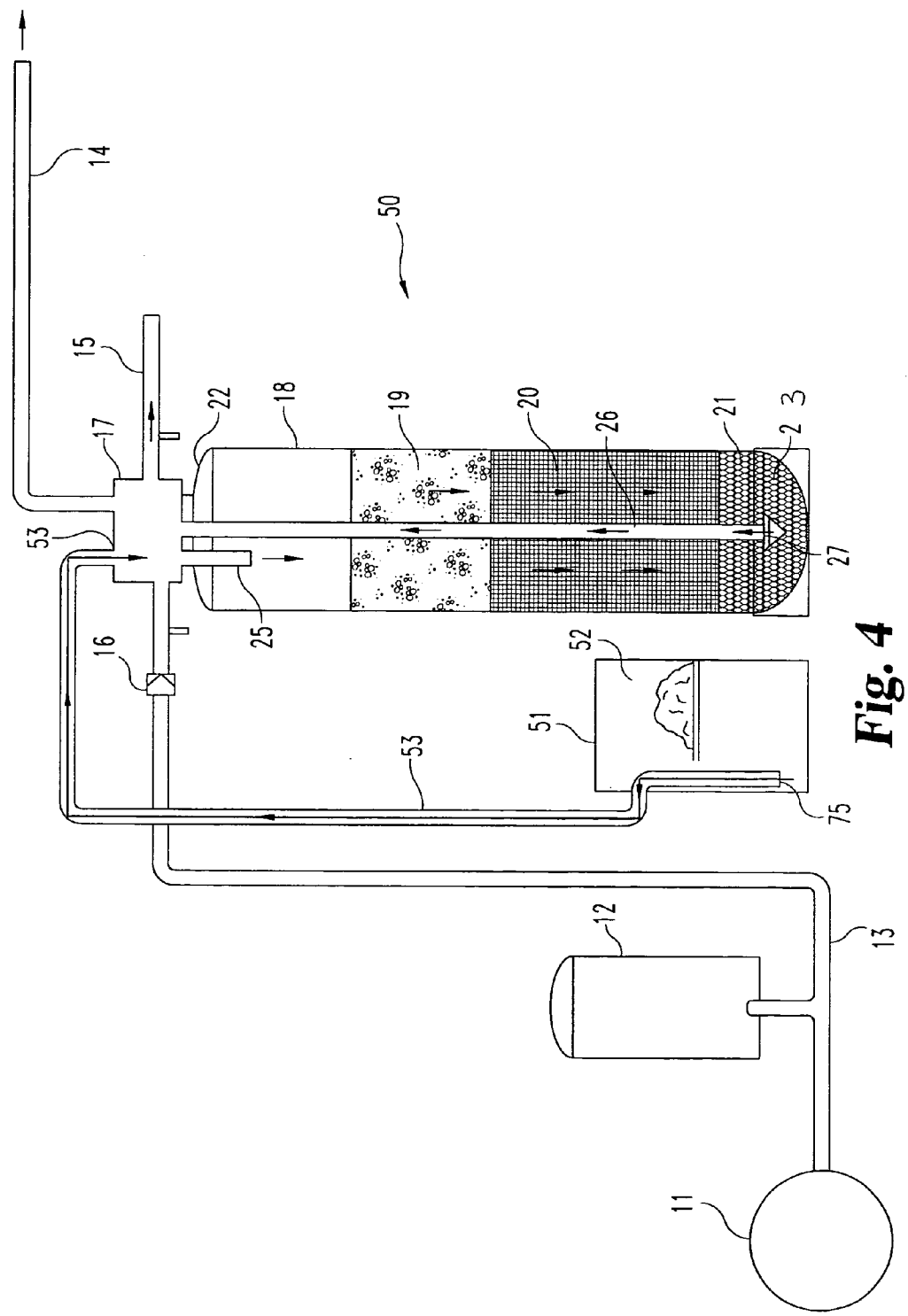

WATER TREATMENT SYSTEM

BACKGROUND OF THE INVENTION

The present invention relates generally to water treatment systems for removing contaminants from a water supply prior to delivery to an end user. More particularly, in one form the present invention relates to a water treatment system utilizing a venturi to draw air into a treatment tank independently of the passage of treated water to the end user.

It is well recognized that most well water contains many contaminants. Common naturally occurring contaminants in well water include iron, sulfur, and manganese. These mineral contaminates may cause stained plumbing fixtures and corroded pipes and in addition, may result in the presence of disagreeable odors and an unpleasant taste in the water.

Many different water treatment systems have been developed over the years in attempts to remove contaminants from water supplies. These water treatment systems have been utilized for municipal water systems and individual well systems. It is generally recognized that the three prominent water treatment system types for removal of contaminates from water include chlorination, ion exchange, and oxidation/filtration. In water treatment systems, it is known that many of the contaminants must first be oxidized to permit subsequent removal by filtration.

While many of the prior water treatment systems have been a step in the right direction, there remains a need for further technological development. The present invention provides a novel and non-obvious water treatment system applicable to all types of water supplies.

SUMMARY OF THE INVENTION

One form of the present invention contemplates a water treatment system, comprising: a tank having a top and a bottom; a control valve located at the top and in fluid communication with the tank, the control valve including a source water inlet adapted to be coupled to a source of water, a drain outlet, a treated water outlet and an air inlet, the air inlet is in fluid flow communication with a venturi disposed within the control valve, the control valve operable to control the passage of fluids between the inlets and outlets and the tank, the control valve controlling the flow of source water through the venturi to draw air through the air inlet and into the tank; and a one way valve in fluid communication with the air inlet, the one way valve allowing the introduction of air to the air inlet.

Another form of the present invention contemplates a water treatment system, comprising: a mechanical housing having an interior volume for holding fluids, the mechanical housing having a top and a bottom; and a valving mechanism coupled at the top of the mechanical housing and disposed in flow communication with the interior volume, the valving mechanism including a source water inlet adapted to be coupled to a source of water, a drain outlet, a treated water outlet for the passage of treated water therefrom and an air inlet, the air inlet is in flow communication with a venturi within the valving mechanism, the valving mechanism being operable to control the flow of source water through the venturi to draw air through the air inlet and into the tank independently of the passage of treated water from the treated water outlet.

Yet another form of the present invention contemplates a method of operating a water treatment system to treat a source water, comprising: treating a source water within a tank including air, the treating includes moving the source water through a media in a first flow direction within the tank; backwashing the source water through the media in a second direction within the tank, wherein the backwashing expels at least a portion of the source water and the air through a drain; and drawing air into the tank by flowing source water by a venturi within a control valve coupled to the tank, the source water flows into the tank with the air in the first flow direction after passing through the venturi, wherein the air displaces the source water within the tank as the water in the tank empties.

Yet another form of the present invention contemplates a method of operating a water treatment system to treat a source water, comprising: treating a source water within a first tank including air, the treating includes moving the source water through a filtering media in a first flow direction within the first tank; filling a second tank with source water; backwashing the source water in the first tank through the filtering media in a second direction within the first tank, wherein the backwashing expels at least a portion of the source water and the air through a drain; drawing a fluid from the second tank into the first tank by flowing source water by a venturi within a control valve coupled to the first tank, the fluid flows into the first tank in the first flow direction after passing through the venturi; pulling air from the second tank into the first tank by flowing source water by a venturi within a control valve coupled to the first tank after the drawing, the source water flows into the first tank in the first flow direction after passing through the venturi, wherein the air displaces the source water within the tank as the tank is emptied of water.

One object of the present invention is to provide a unique water treatment system.

Related objects and advantages of the present invention will be apparent from the following description.

BRIEF DESCRIPTION OF THE DRAWINGS

FIG. 4 is a schematic representation of a single stage air induction sulfur water treatment system comprising one form of the present invention.

DESCRIPTION OF THE PREFERRED EMBODIMENTS

Figure 1:
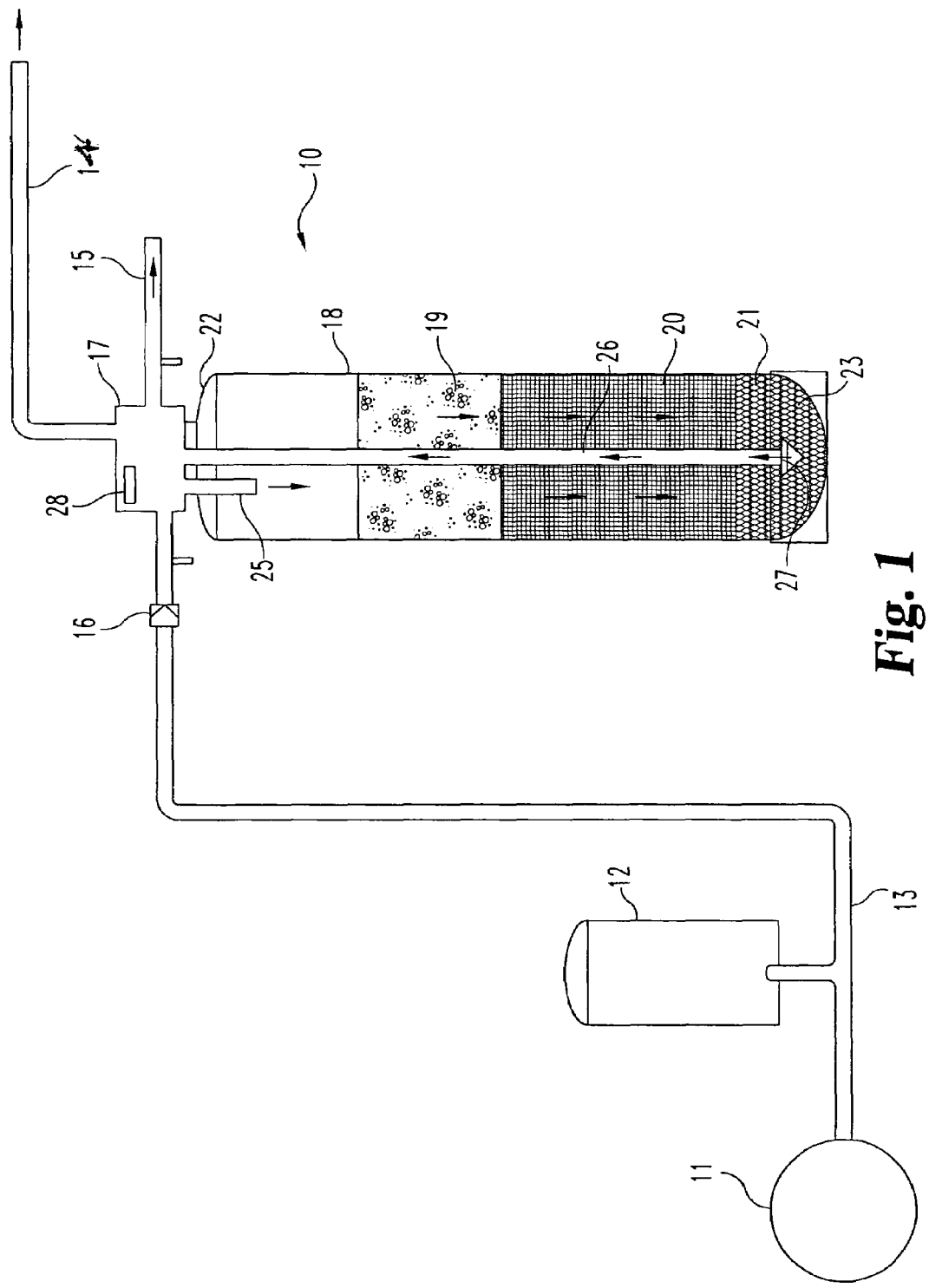
FIG. 1 is a schematic representation of a single stage air induction water treatment system comprising one form of the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is schematically illustrated a water treatment system 10 in fluid communication with a water source 11. The water treatment systems contemplated herein are designed to remove/control iron, sulfur, methane gas, and odor from water supplies. The water treatment system 10 will be generally referred to as a single stage air induction filter system. Water source 11 may be a well, ground water, or other source of water appropriate for utilization by an end user. In one embodiment, a pressure tank 12 forms a portion of the water system. The principal components of the water system are connected in fluid flow communication by water pipes indicated generally at 13, 14 and 15. In one embodiment a one-way valve 16 is disposed within the water system to prevent backflow from the water treatment system to the water source 11. The reader should understand that the illustrated water system is purely illustrative, and a person of ordinary skill in the art will appreciate that many variations are contemplated herein.

The water treatment system 10 will be described with reference to the primary removal of iron. However, the present application contemplates that the system may also be used for the primary removal of sulfur. In a system utilized for the primary removal of sulfur, there will be utilized a mixed filtration medium including: (KDF) a redox media of copper-zinc granules; (Centaur) an activated carbon designed to develop catalytic functionality and produced from bituminous coal; and a support bed as disclosed for the iron system. The support bed remains at the bottom of the tank and the KDF material is disposed below the Centaur material. The KDF is available from KDF Fluid Treatment, Inc. of Three Rivers, Mich., and the Centaur is available from Calgon Carbon. However, other filtration media and support media are contemplated herein. In one form of the present application, the water treatment system tailored for the removal of sulfur from source water will use cycles operating substantially like system 10; the difference in the systems being the utilization of different filtration media.

The single stage water treatment system 10 includes as its principal components a control valve 17 and a tank 18 having an interior volume 19. Interior volume 19 includes a filtration media 20 placed upon a support bed 21. In one system tailored for the removal of iron from the source water, it has been found that a mixed filtration media including: (Birm) a manganese dioxide-coated pumicite which has a mesh size of about 0.49 mils and a dry density of about forty to forty five pounds per cubic foot; (Filter-Ag) an aluminum silicate with a mesh size of about 0.6 mils and a dry density of about twenty-five pounds per cubit foot; and a support bed of gravel/quartz and garnet. The support bed generally remains at the bottom portion of the tank. In one form the garnet has a mesh size of about eight to twelve mils and a dry density of about 135 pounds per cubic foot and the gravel/quartz has a piece size within a range of about ⅛ inches to about ¼ inches. The Birm and Filter-Ag material are available from Clack Corporation of Windsor, Wis. While one example of a filtration media and support bed has been called out, it is understood that other filtration media and support bed(s) or no support bed as would be desirable to the specific application are contemplated herein.

In one form, the tank 18 has a diameter within the range of about six inches to about twenty-four inches and a length of about thirty-six inches to about seventy-two inches from the top end 22 to the bottom end 23 of the tank. However, in one form the tank 18 has a diameter within a range of about ten inches to about thirteen inches and a length of about fifty-four inches. However, the present application contemplates a variety of other sizes and does not intend to limit the tank size to the above values unless specifically provided to the contrary. The tank is formed of materials such as, but not limited to, plastic, metals, polyethylene liner wrapped in fiberglass. The selection of appropriate materials for the tank is believed within the capability of one of ordinary skill in the art. In form of the present invention the passage of sunlight into the interior volume 19 of the tank is preferably prevented. In other forms of the present invention there is contemplated that the tank may be transparent.

Source water is introduced through water pipe 13 to the control valve 17, where it is directed by the valve to a fluid flow connection 25. Fluid(s) pass through the fluid flow connection 25 into the interior volume 19 of the tank. A fluid flow connection 26 is disposed within the interior volume 19 of the tank 18. In one form, the fluid flow connection 26 includes a pick up end 27 located proximate the bottom end 23 of the tank 18. The pick up end 27 facilitates the entrance and discharge of fluid from the fluid channel 26. The pick up end 27 further includes a screen to prevent material above a predetermined size from being drawn into the fluid flow connection 26. In another form of the present invention, it is contemplated that the system does not include a pick up end 27, but does include a filtering screen.

Water pipe 14 is connected to a drain, and the passage of the water and air therefrom is controlled by the control valve 17. The control valve 17 is disposed in fluid communication with each of the water pipes 13 through 15 and the fluid flow connections 25 and 26. The fluid flow connections 25 and 26 communicate with the interior volume 19 of tank 18. The control valve 17 is a programmable apparatus which is operable to control fluid flow through the water treatment system 10. The control valve is preferably an electronic programmable valve, however other methods of controlling the programming of the valve are or sequence and timing of the cycles are contemplated herein. A preferred form of control valve 17 is a Model CC available from Clack Corporation of Windsor, Wis. The preferred control valve has the capability for adjusting the sequence and timing of a plurality of processing cycles. The present application contemplates the utilization of other types of control valves provided they include an internal venturi operatable to draw a secondary fluid into the control valve as the source water flow through the control valve 17. In one form of the present invention, the passage of the secondary fluid into the control valve 17 is independent of the discharge of any treated water from water pipe 15 of system 10.

Figure 7:
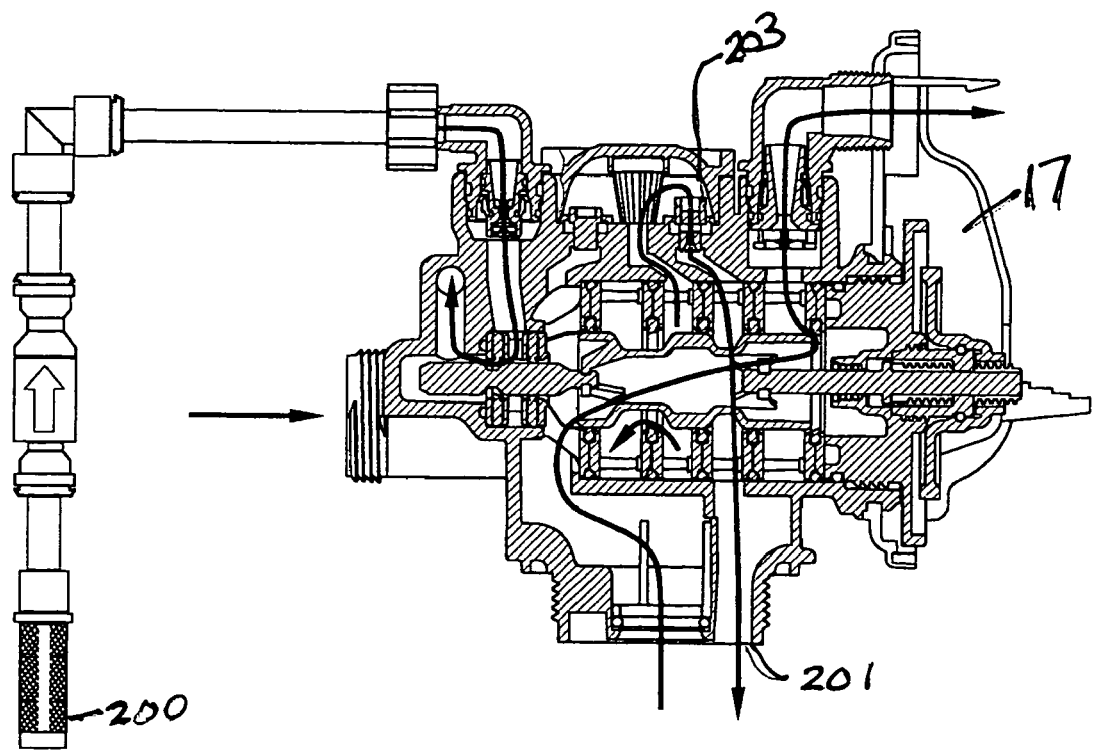
FIG. 7 is an illustrative sectional view of one form of a control valve in an air induction cycle comprising a portion of a water treatment system.

With reference to FIG. 1, there is schematically illustrated an air induction pick up 28 that is in fluid flow communication with the internal venturi. In one embodiment, the air induction pick up 28 has a one-way valve (FIG. 7) coupled thereto to prevent the discharge of any fluid from the control valve via the air induction pick up 28. More preferably, the control valve is a one-way check valve that only allows fluid (liquid and/or gas) flow to the control valve 17.

Figure 2C:
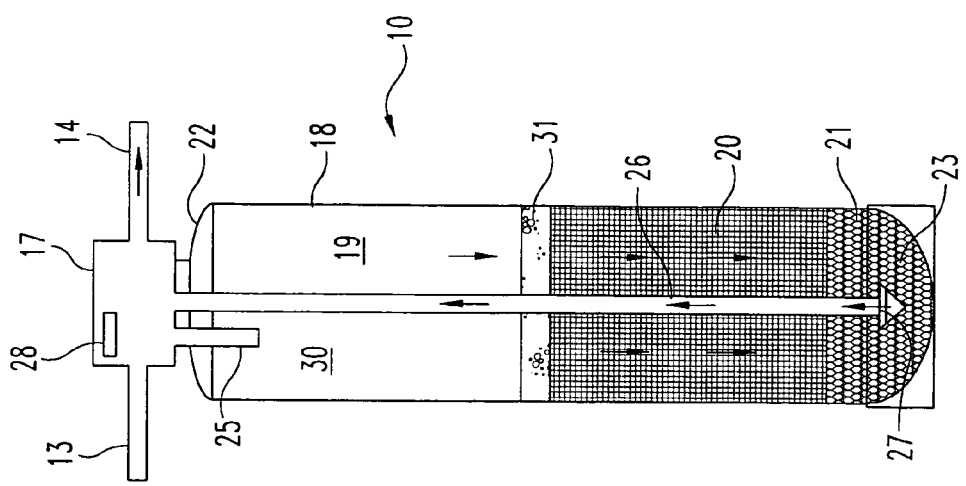
FIG. 2c is a schematic representation of one embodiment of the air induction cycle comprising a portion of the water treatment system of FIG. 1.
Figure 2B:
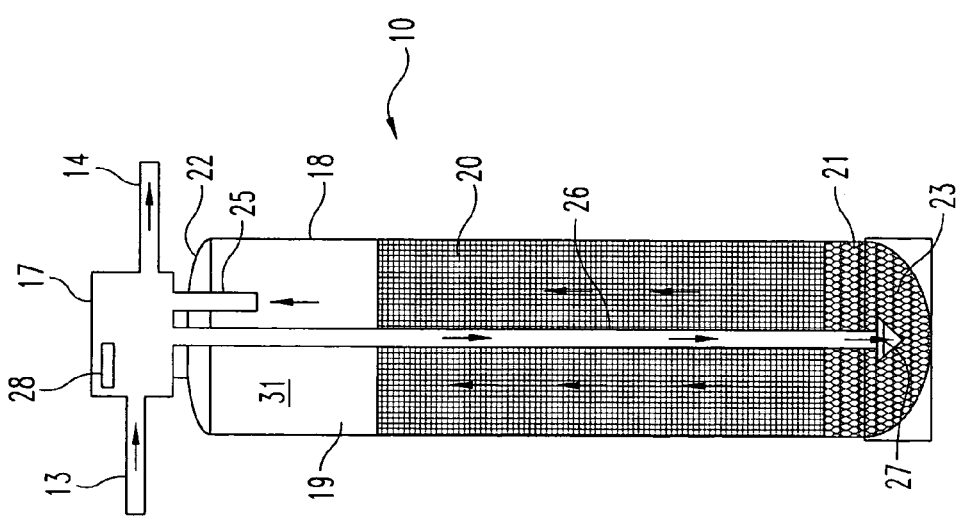
FIG. 2b is a schematic representation of one embodiment of the backwashing cycle comprising a portion of the water treatment system of FIG. 1.
Figure 2A:
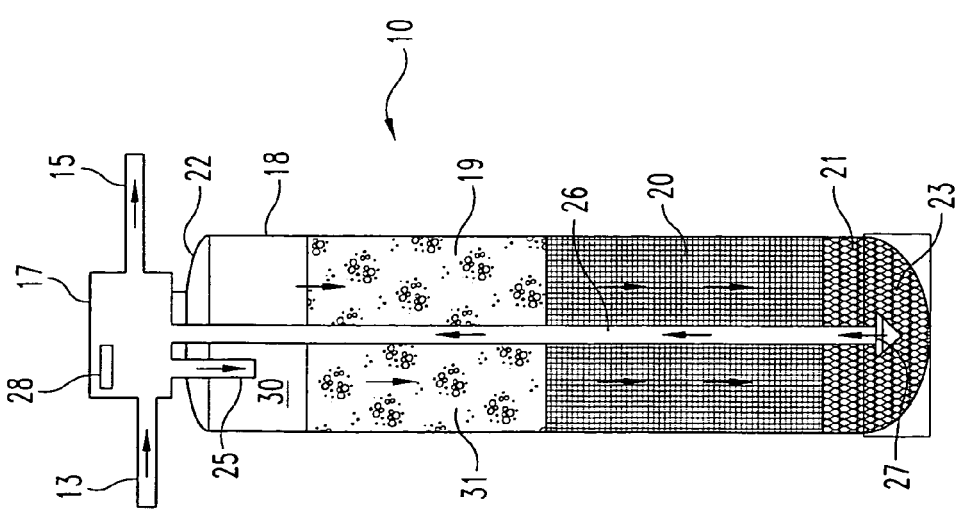
FIG. 2a is a schematic representation of one embodiment of the filtering cycle comprising a portion of the water treatment system of FIG. 1.

With reference to FIGS. 2a through 2c, there will be described a method of operating the water treatment system 10. in one form the method described with reference to FIGS. 2a through 2c is repeated once per day, however other time intervals are contemplated herein. Before describing the operation of the water treatment system 10, it should be noted that the present system is preferably operated with source water having a pH of greater than or equal to 6.8. If the pH of the source water is below 6.8, it is preferred that a pH adjustment option be utilized when treating the source water for iron with the water treatment system of the present application. Methods appropriate for rising the pH of the water are generally known to those of ordinary skill in the art and include the introduction of calcium carbonate into the source water. The present application contemplates utilization of the inventive water treatment systems herein to also treat source water for sulfur when the pH of the water is less than 6.8. Further, the water supply must have an adequate fluid flow and pressure to backwash the filtration media 20 located within the interior volume 19 of the tank 18. In one form the fluid flow pressure is within a range of about 20 pounds-per-square-inch to about 125 pounds-per-square-inch and the flow rate is within a range of about 0.25 gallons-per-minute-per-square-foot of-bed-area to about 20 gallons-per-minute-per-square-foot of-bed-area. The water treatment system 10 described with reference to FIGS. 2a through 2c will be utilized to both oxidize the contaminants and filter the source water. The control valve 17 is programmed to control the water treatment system 10 to provide a filtering cycle, a backwashing cycle, and an air induction cycle.

The filtering cycle will be described herein with reference to FIG. 2a. During the filtering cycle, source water flows through water pipe 13 into the control valve 17, where it is routed to the fluid flow connection 25. The source water is discharged from the fluid flow connection 25 in a downward direction and passes through a head of air 30 located in a portion of the interior volume of the tank 18. The source water as it travels through the head of air 30 is oxidized, and the oxidized matter is subsequently filtered out by the filtration media 20. Source water 31 after passing through the head of air 30 and filtration media 20 will flow into the pick up end 27 of the fluid flow connection 26. The water flows through the fluid flow connection 26 to the control valve 17. Control valve 17 is operable to direct the flow of water within the valve, and the treated water is discharged through water pipe 15 to the end user and/or for further processing. The further processing may include, but is not limited to, water softening.

With reference to FIG. 2b, there will be described the backwashing cycle of the water treatment system 10. The backwashing cycle functions to relieve the trapped air 30 from within the interior volume 19 of the tank 18. During the backwashing cycle, the control valve 17 directs incoming source water from water pipe 13 into the fluid flow connection 26. The source water is discharged out of the pick up end 27 and passes upwardly through the support bed 21 and filtration media 20. As the water flows out of the pick up end 27, it fills the interior volume 19 of the tank 18 with water. The incoming water pushes the air 30 out of the tank through the fluid flow connection 25 and to the drain 14.

The space within the interior volume 19 that was previously occupied by the head of air 30 is now filled with water that has passed through the filtration media 20. The figures are illustrative, and there is no limitation intended herein by the depiction of the fluid flow connection 25 being in the tank that there is always some residual head of air 30 within the tank. In one preferred form the fluid flow connection 25 couples to the interior of the tank at the outer surface defining the tank volume. The present application contemplates that there may be a residual head of air within the interior volume 19 after the backwashing cycle, or that the entire head of air 30 was relieved and discharged through the drain 14. The flow of source water from the pick up end 27 through the filtration media 20 is continued for a predetermined period of time to separate the filtration media 20 and remove contaminants from the media that are able to be washed away. In one form of the present invention, the backwashing cycle lasts about ten minutes. However, backwashing cycles having other times are contemplated herein.

With reference to FIG. 2c, there will be described one embodiment of the air induction cycle that follows the backwashing cycle. Source water flows through the control valve 17 and is directed into the interior volume 19 through the fluid flow connection 25. As the source water flows through the control valve 17, it passes by an internal venturi, which pulls/draws air into the control valve 17 through an air induction port 28. Control valve 17 directs the output from the fluid flow connection 26 to pass to drain 14. Thus, as the source water and air flows through the control valve 17 and into the interior volume 19, the tank is being filled with air as the water is passing out of the drain 14. The air induction cycle is continued to substantially drain the interior volume 19 of water and fill the volume of the tank not occupied by filtration media 20 with air. However, the present application contemplates that some residual water may be present in the tank at the end of the air induction cycle. In one form the air induction cycle lasts between about 30 and about 40 minutes. However, other air induction cycle times are contemplated herein.

Introduction of air into the interior volume 19 functions to revitalize the filtration media. Upon completion of the air induction cycle, the control valve 17 switches to the filtering cycle. During the filtering cycle, source water enters through water pipe 13 in a down flow direction, thereby trapping a head of air 30 in the upper portion of the tank adjacent end 22.

Figure 3:
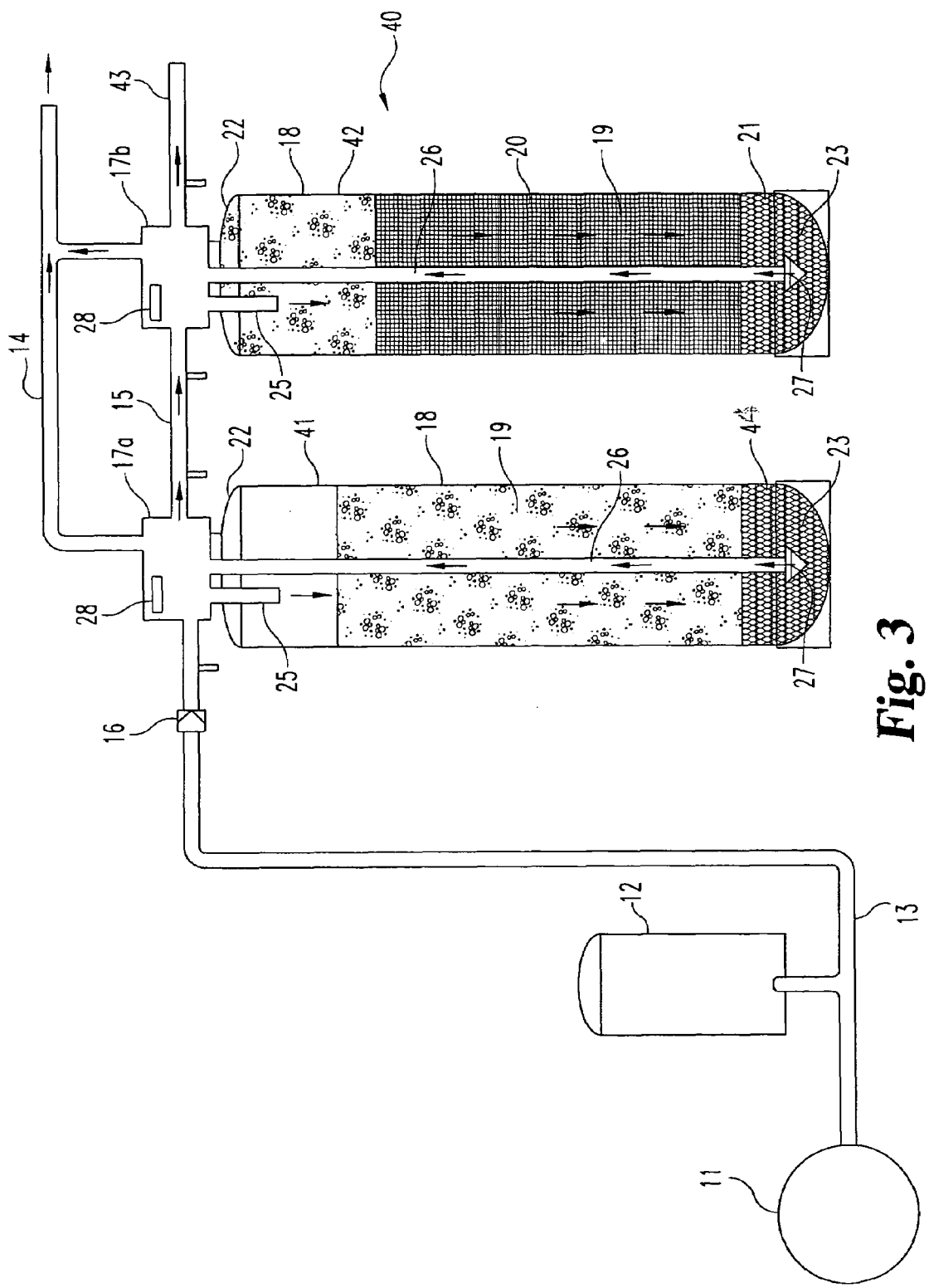
FIG. 3 is a schematic representation of a dual stage air induction iron water treatment system comprising one form of the present invention.

With reference to FIG. 3, there is illustrated one embodiment of a dual stage water treatment system 40. In one form of the present invention, the dual stage water treatment system 40 is a dual stage air induction iron filtration system. The water treatment system 40 includes a first stage tank 41 for air introduction and oxidation of the contaminants within the source water. The use of like feature numbers will be utilized to represent like features. The water treatment system 40 also includes a second stage filtration tank 42. The tanks 41 and 42 are coupled in fluid flow communication with the water source 11 by water piping 13 and 15. Control valves 17a and 17b are utilized to operatively control the water flow through the system 40. Water from the water source 11 passes through the first stage tank 41 and is sequentially processed in the second stage tank 42. The first stage tank 41 is defined by tank 18 having interior volume 19. Disposed within the interior volume 19 at the bottom end 23 is support media 44. In a preferred form, the support media is quartz/gravel and garnet; however, other support media is contemplated herein. In one form the support media provides for some filtration capability. The fluid flow connection 25 and connection 26 are disposed in fluid communication with interior volume 19.

The second stage filtration tank 42 is defined by tank 18 having internal volume 19. The second stage tank 42 is utilized for primary filtration of the water in the water treatment system. Located within the interior volume 19 of the tank 18 is a filtration media 20 and support bed 21. In one system tailored for the removal of iron from the source water, it has been found that a mixed filtration media including: (Birm) a manganese dioxide-coated pumicite which has a mesh size of about 0.49 mils and a dry density of about forty to forty five pounds per cubic foot; (Filter-Ag) an aluminum silicate with a mesh size of about 0.6 mils and a dry density of about twenty-five pounds per cubic foot; and a support bed of gravel/quartz and garnet. The support bed generally remains at the bottom portion of the tank. In one form the garnet has a mesh size of about eight to twelve mils and a dry density of about 135 pounds per cubic foot and the gravel/quartz has a piece size within a range of about ⅛ inches to about ¼ inches. The Birm and Filter-Ag material are available from Clack Corporation of Windsor, Wis. However, other materials for the filtration media and support media are contemplated herein.

The second control valve 17b is disposed in fluid flow communication with the outlet 15 from the control valve 17a of the first stage tank 41. The second control valve 17b is disposed in fluid communication with the second stage tank 42 via the fluid flow connections 25 and 26. The fluid flow connection 26 includes the pick up 27. Control valve 17b will direct the output from the second stage tank 42 to the drain 14 or to an end user via piping 43.

Figure 3A:
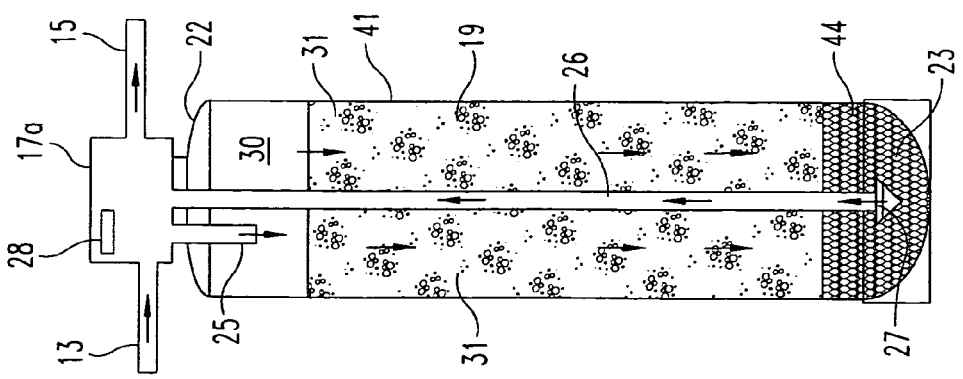
FIG. 3a is a schematic representation of one embodiment of the filtering cycle within the air tank comprising a portion of the water treatment system of FIG. 3.
Figure 3B:
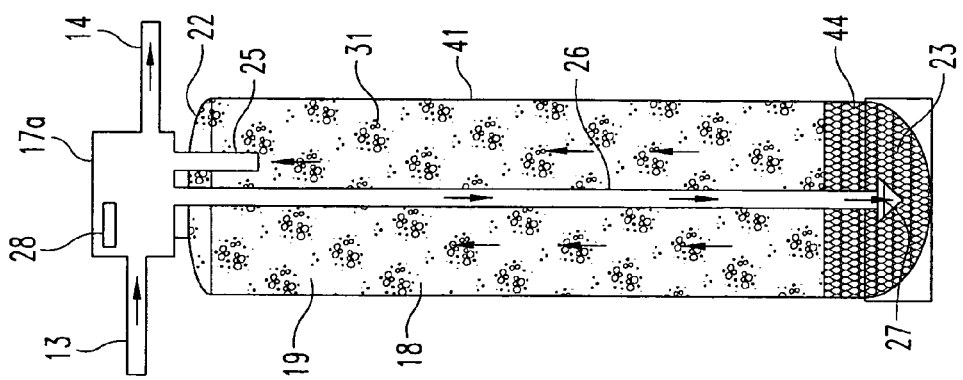
FIG. 3b is a schematic representation of one embodiment of the backwashing cycle within the air tank comprising a portion of the water treatment system of FIG. 3.
Figure 3C:
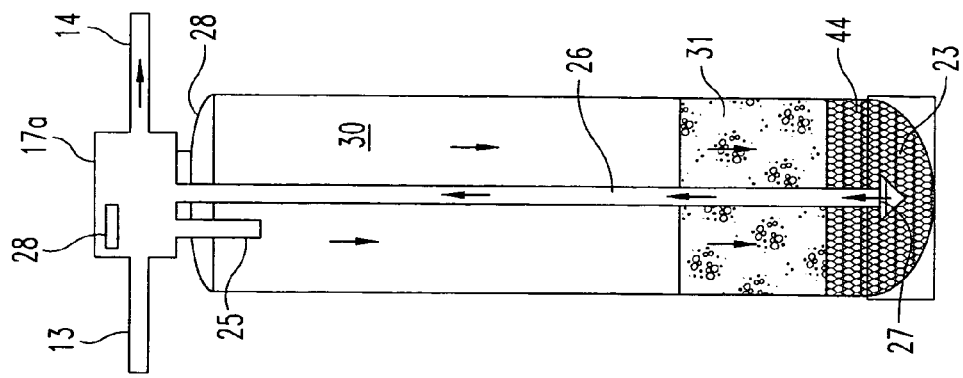
FIG. 3c is a schematic representation of one embodiment of the air induction cycle comprising a portion of the water treatment system of FIG. 3.

With reference to FIGS. 3a through 3c, there will be described a method of operating the first stage tank 41 of the water treatment system 40. The second stage 42 will be operated as a traditional multimedia backwashing filter. Backwashing filters are generally known to those of ordinary skill in the art and act as a backwashing filter including a backwash and rinse cycle. In a preferred form of the present invention, the second stage 42 is regenerated before the first stage 41 is regenerated. The control valve 17a for the first stage 41 is programmed to provide the filtering cycle, the backwashing cycle, and the air induction cycle. The processing cycles described for water treatment system 40 are substantially similar to the cycles described for the water treatment system 10.

With reference to FIG. 3a, there will be described a method of operating the filtering cycle of water treatment system 40. The filtering cycle allows for the introduction of source water through water pipe 13 to the control valve 17a, where it is routed to the fluid flow connection 25. The source water is discharged from the fluid flow connection 25 in a downward direction and passes through a head of air 30 located in a portion of the interior volume 19 adjacent the end 22. The source water as it travels through the head of air 30 is oxidized, and the oxidized matter is substantially filtered out by the filtration media 20. Source water 31 after passing through the head of air 30 and support media 44 will flow into the pick up end 27 of the fluid flow connection 26. The water flows through the fluid flow connection 26 to the control valve 17a. Control valve 17a is operable to direct the flow of water within the valve, and the treated water is discharged through water pipe 15 to the second stage 42 for filtration.

With reference to FIG. 3b, there will be described the backwashing cycle of the water treatment system 40. The backwashing cycle functions to relieve the trapped air 30 from within the interior volume 19 of the tank 18 in first stage 41. During the backwashing cycle, the control valve 17 directs the incoming source water from water pipe 13 into the fluid flow connection 26. The source water is discharged out of the pick up end 27 and passes upwardly through the filtration media 44. As the water flows out of the pick up end 27, it fills the interior volume 19 of the tank 18 with water. The incoming water pushes the air 30 out of the tank through the fluid flow connection 25 and to the drain 14. The space within the interior volume 19 that was previously occupied by the head of air 30 is now filled with water that has passed through the support media 44. The figures are illustrative, and there is no limitation intended by the location of fluid flow connection 25 that there is always some residual head of air 30 within the tank. The present application contemplates that there may be a residual head of air within the interior volume 19 after the backwashing cycle, or the entire head of air 30 was relieved and discharged via the drain 14. The flow of source water from the pick up end 27 and through the support 44 is continued for a pre-determined time to separate the media and remove contaminants from the media that are able to be washed away. In one form of the present invention, the backwashing cycle lasts about ten minutes. However, backwashing cycles having other times are contemplated here.

With reference to FIG. 3c, there will be described one embodiment of the air induction cycle that follows the backwashing cycle. Source water flows through the control valve 17a and is directed into the interior volume 19 through the fluid flow connection 25. As the source water flows through the control valve 17a, it passes by the internal venturi, which pulls/draws air into the control valve 17a through the air induction port 28. Control valve 17a directs the output from the fluid flow connection 26 to pass to drain 14. Thus, as the water and air flows into the tank 19, the tank is being filled with air and the water is passing through the control valve 17a and out of the drain 14. The air induction process is continued to substantially drain the interior volume 19 of water and fill the volume of the tank 18 not occupied by support media 44 with air. Upon completion of the air induction cycle, the control valve 17a switches to the filtering cycle. In the filtering cycle, water enters through fluid flow connection 25 to the tank 18 in a normal down flow direction, thereby trapping a head of air 30 in the upper portion 22 of the tank 18.

With reference to FIG. 4, there is schematically illustrated another embodiment of a water treatment system 50 in fluid communication with a water source 11. The description of the water treatment system 50 is similar to the water treatment system 10, and like feature numbers will be used to represent like features. Water treatment system 50 includes a solution tank 51 that is disposed in fluid flow communication with the control valve 17. The interior volume 52 of the solution tank 51 is disposed in fluid flow communication with the fluid induction port 75 via a fluid flow passageway 53. The source water from the water source 11 is delivered via water pipe 13 into the control valve 17, where it is directed by an internal venturi that draws a secondary fluid from the interior volume 52. The secondary fluid drawn from the interior volume 52 may be a liquid and/or a gas such as, but not limited to, air. In a preferred form of the present invention, the interior volume 52 includes a quantity of chlorine that is dissolved by the source water to create a liquid chlorine solution. The present application contemplates other liquid oxidizers including, but not limited to, hydrogen peroxide. While the water treatment system 50 was designed for controlling sulfur levels in water, it may be utilized to treat other types of contaminants within the source water.

The water treatment system 50 utlizes a mixed filtration media including: (KDF) a redox media of copper-zinc granules; (Centaur) an activated carbon designed to develop catalytic functionality and produced from bituminous coal; and a support bed as disclosed above for the single stage iron system. However, other filtration medias and support beds are contemplated herein.

Figure 5C:
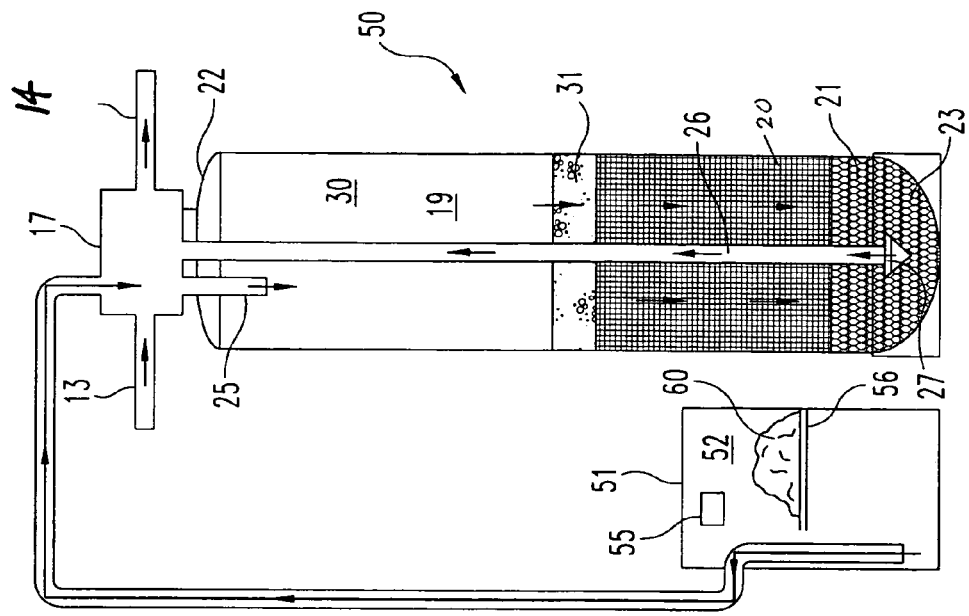
FIG. 5c is a schematic representation of one embodiment of the air induction cycle comprising a portion of the water treatment system of FIG. 4.
Figure 5B:
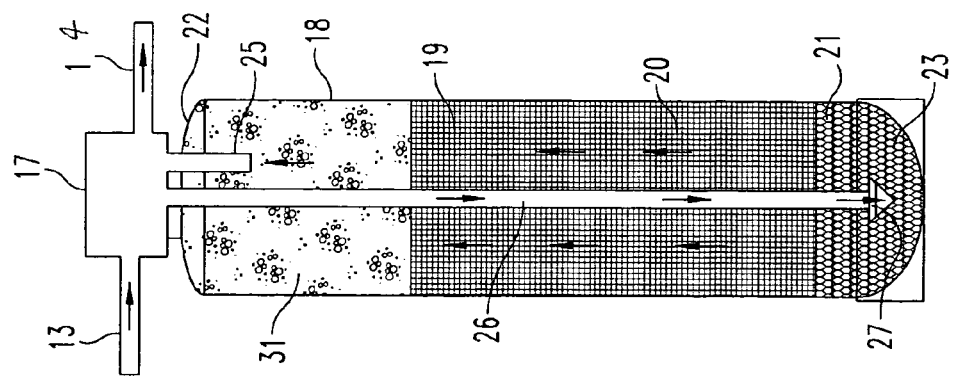
FIG. 5b is a schematic representation of one embodiment of the backwashing cycle comprising a portion of the water treatment system of FIG. 4.
Figure 5A:
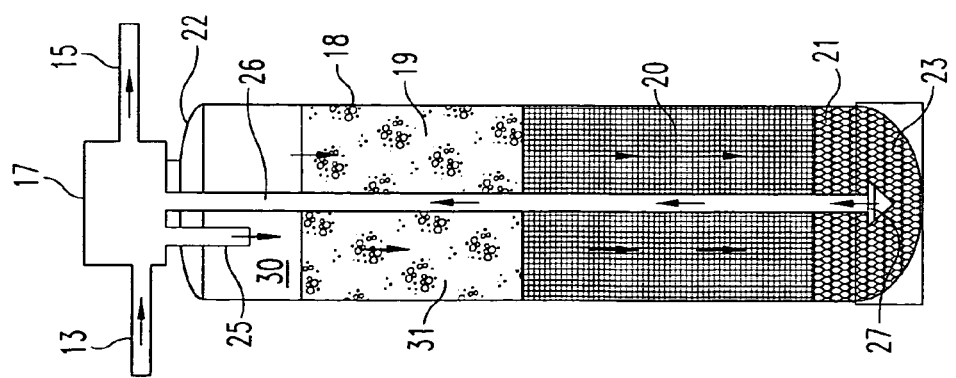
FIG. 5a is a schematic representation of one embodiment of the filtering cycle comprising a portion of the water treatment system of FIG. 4.

With reference to FIGS. 5a through 5c, there will be described a method of operating water treatment system 50. The control valve 17 is programmed to include a filtering cycle, a fill cycle, a backwashing cycle, and a secondary fluid induction cycle. The secondary fluid induction cycle introduces a chlorine solution and/or air into the tank 18. In a preferred form the secondary fluid induction cycle introduces the liquid chlorine solution followed by air into the tank 18.

The filtering cycle introduces source water through pipe 13 into control valve 17, where it is routed through fluid flow connection 25. The source water is discharged from the fluid flow connection 25 in a downward direction and passes through a head of air 30 located in a portion of the interior volume of the tank 18. The source water as it travels through the head of air 30 is oxidized, and the oxidized matter is subsequently filtered out by the filtration media 20. Source water 31 after passing through the head of air 30 and the filtration media 20 will flow into the pick up end 27 of the fluid flow connection 27. The water flows through the fluid flow connection 26 to the control valve 17. Control valve 17 is operable to direct the flow of water within the valve, and the treated water is discharged through water pipe 15 to the end user and/or for further processing. The further processing may include, but is not limited to, water softening.

With reference to FIG. 5c, there will be described the fill cycle in the water treatment system 50. The fill cycle functions to fill the solution tank 51 with source water from the water source 11. The control valve 17 routes the source water from water pipe 13 into the solution tank 51 via the fluid flow passageway 53. In one form of the present invention, the water level within the solution tank 53 is controlled with a float shutoff valve 55. In one form of the present invention, the interior volume 52 contains a quantity of chlorine that is dissolved by the source water delivered into the interior volume 52. In a more preferred form, the chlorine is defined by a plurality of chlorine pellets 60 located on a platform 56. As the level of source water rises above the platform 56, the chlorine pellets 60 are dissolved. Control valve 17 returns the water treatment system 50 to the filtering cycle to allow the source water in the tank 51 to dissolve the chlorine material. In one embodiment, the filtering cycle is run for about 50 minutes while the chlorine material is dissolved. However, other filtering times are contemplated herein.

With reference to FIG. 5b, there will be described the backwashing cycle of the water treatment system 50, which functions to relieve the trapped air 30 from within the interior volume 19 of the tank 18. During the backwashing cycle, the control valve 17 directs the source water from water pipe 13 to the fluid flow connection 26. The source water is discharged out of the pick up end 27 and passes upwardly through the support bed 21 and filtration media 20. As the water flows out of the pick up end 27, it fills the interior volume 19 of the tank with water. The incoming water pushes the air 30 out of the tank through the fluid flow connection 25 and to the drain 14.

The space within the interior volume 19 that was previously occupied by the head of air 30 is now filled with water that has passed through the filtration media 20. The figures are illustrative, and there is no limitation intended by the location of fluid flow connection 25 that there is always some residual head of air 30 within the tank. The present application contemplates there must be a residual head of air within the interior volume 19 after the backwashing cycle or the entire head of air 30 was relieved and discharged through the drain 14. The flow of source water from the pick up end 27 through the filtration media 20 is continued for a predetermined period of time to separate the filtration media and remove the contaminants from the media that are able to be washed away. In one form of the present invention, the backwashing cycle lasts about 10 minutes. However, backwashing cycles having other times are contemplated herein.

In reference to FIG. 5c, there will be described one embodiment of the chlorine/air induction cycle that follows the backwashing cycle. Source water flows through the control valve 17 and is directed into the interior volume 19 through the fluid flow connection 25. As the source water flows through the control valve 17, it passes by an internal venturi, which pulls/draws the chlorine solution from the interior volume 52 through the fluid flow passageway 53 to the control valve 17. The control valve 17 directs the chlorine into the interior volume 19 of tank 18 through the fluid flow connection 25. As the source water continues to flow by the venturi, it continues to draw the secondary fluid from the interior volume 52, and upon the level of liquid within the interior volume being below the pick up point 75, air is drawn into the passageway 53. The air continues through the passageway 53 to the control valve 17 and is directed out of fluid flow connection 25 to the interior volume 19. Thus, as the source water and air flows into the interior volume of tank 19, the tank is being filled with air as the water is passing out of the drain 14.

The air induction cycle is continued to substantially drain the interior volume 19 of water and fill the volume of the tank not occupied by filtration media 20 with air. The introduction of air into the interior volume 19 functions to revitalize the filtration media, and the introduction of the chlorine solution provides a strong oxidizer to reduce/ reverse the build up of sulfur in the filter tank. Upon completion of the chlorine/air induction cycle, the control valve 17 switches to the filtering cycle. In the filtering cycle, source water enters through the fluid flow connection 25 in a normal down flow direction, thereby trapping a head of air 30 in the upper portion of the tank.

Figure 6:
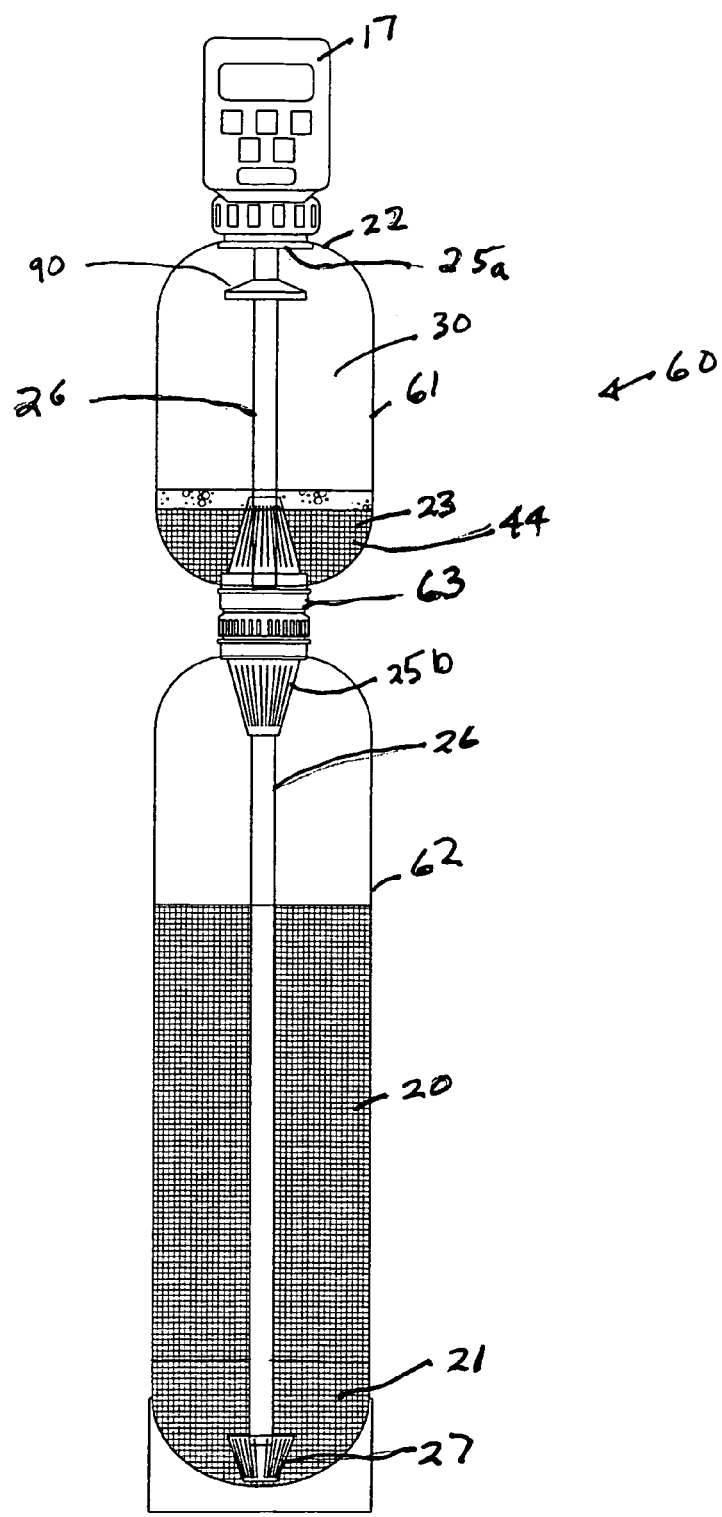
FIG. 6 is an illustrative view of one embodiment of a dual chambered water treatment system of the present invention.

With reference to FIG. 6, there is illustrated one embodiment of a dual stage water treatment system 60. The dual stage water treatment system 60 is substantially similar to the dual stage water treatment system 40 set forth above. The system 60 is a dual stage air induction iron filtration system. In system 60 the first stage tank 61 is coupled to the second stage tank 62 by a tank adaptor 63. The first stage tank 61 functions as the air tank for oxidation of the water and the second stage tank functioning as the filtration tank. The tank adaptor 63 couples the fluid flow connections 25 and 26 between the tanks 61 and 62. The water treatment system 60 operates substantially similar to system 10 with the exception being that the oxidation occurs in a separate tank than the filtration. Further, the tanks are stacked and a single control valve 17 is utilized to direct the fluid flows.

During the filtering cycle, the source water flows from control valve 17 and out through the fluid connection 25*a* past the cascading member 90 into the tank 61. After passing through the head of air 30, it passes through the support media 44. The water flows from the support media through a fluid flow path within the tank adaptor 63 and is discharged from fluid connector 25*b* into the tank 62. Thereafter, the water flows through the filtration media 20 and the support media 21 to the fluid flow connection 26. The water passes through the fluid flow connection 26 to the control valve 17. In the backwashing cycle, the control valve directs incoming source water into the fluid flow connection 26. The source water is discharged out of the pick up end 27 and passes upwardly through the support bed 21 and the filtration media 20. The water fills the lower tank 62 and passes into the upper tank 61 via fluid connection 25*b*. The filling with water continues to push the air out of of the tanks 61 and 62 via fluid connection 25*a*. The air induction cycle utilizes the flow of source water through the control valve 17 to draw air into the interior of the tanks 61 and 62. The source water flowing by the internal venturi draws/pulls air into the tanks through the air induction port 28. The air flows between the two tanks through fluid connection 25*b*. As the source water and air flow into the interior of the tanks, the tanks are being filed with air as the water is passing out through fluid connection 26 to the drain.

With reference to FIGS. 7-10, there are illustrated sectional views through the control valve 17. The flow path in FIG. 7 corresponds to flow through the-valve in an air induction cycle. The air is sucked in through 200 and passes out of the valve to the tank at 201. The injector 203 provides the venturi for pulling the secondary fluid into the valve. In one form, the present invention oversizes the injectors 203 relative to the design information from the manufacturer on the valve. However, the present application also contemplates the utilization of the control valve 17 having standard/normal sized injectors. The oversizing of the injectors allows the introduction of the air at relatively high rates relative to the standard/normal injector size. By increasing the injector size over the normal/standard design parameters, one can reduce the required cycle time.

Figure 8:
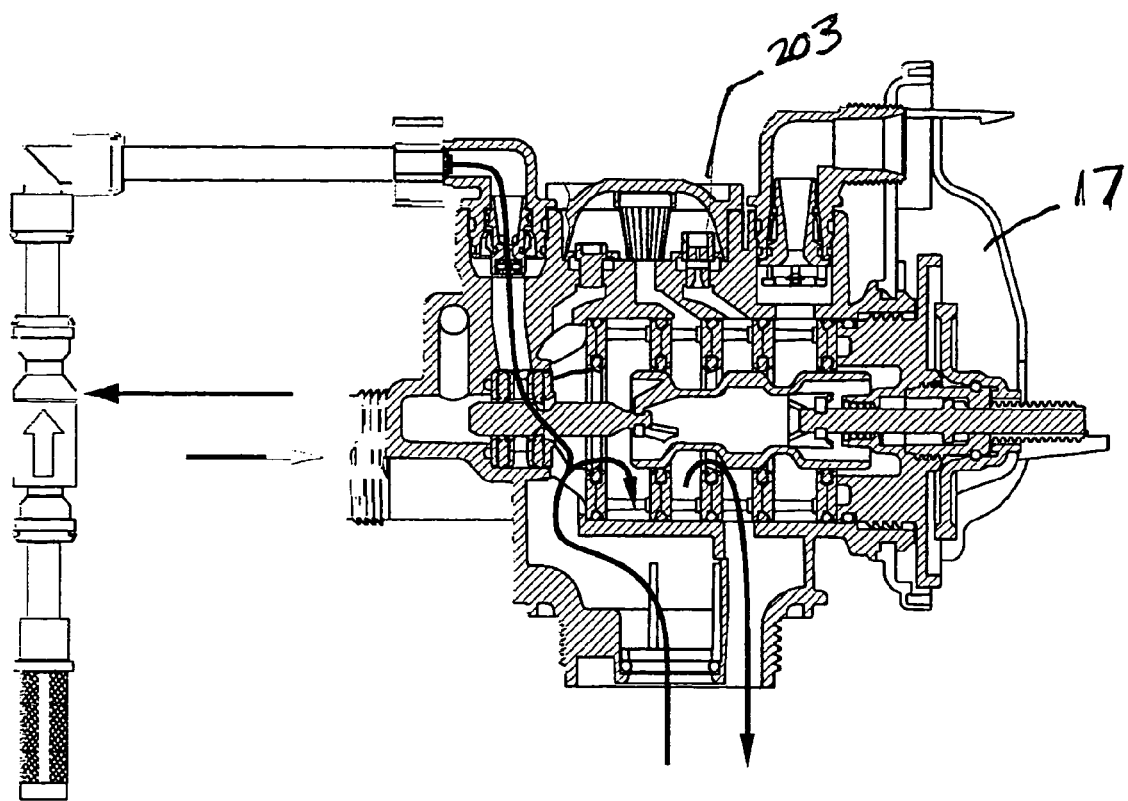
FIG. 8 is an illustrative sectional view of one form of a control valve in a fill cycle comprising a portion of a water treatment system.
Figure 9:
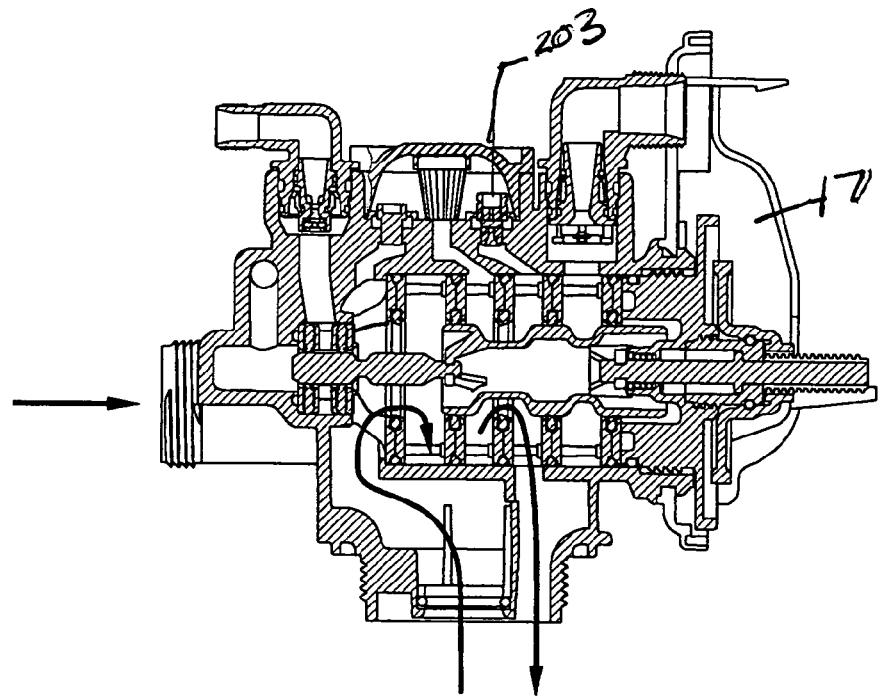
FIG. 9 is an illustrative sectional view of one form of a control valve in a filtering cycle comprising a portion of a water treatment system.
Figure 10:
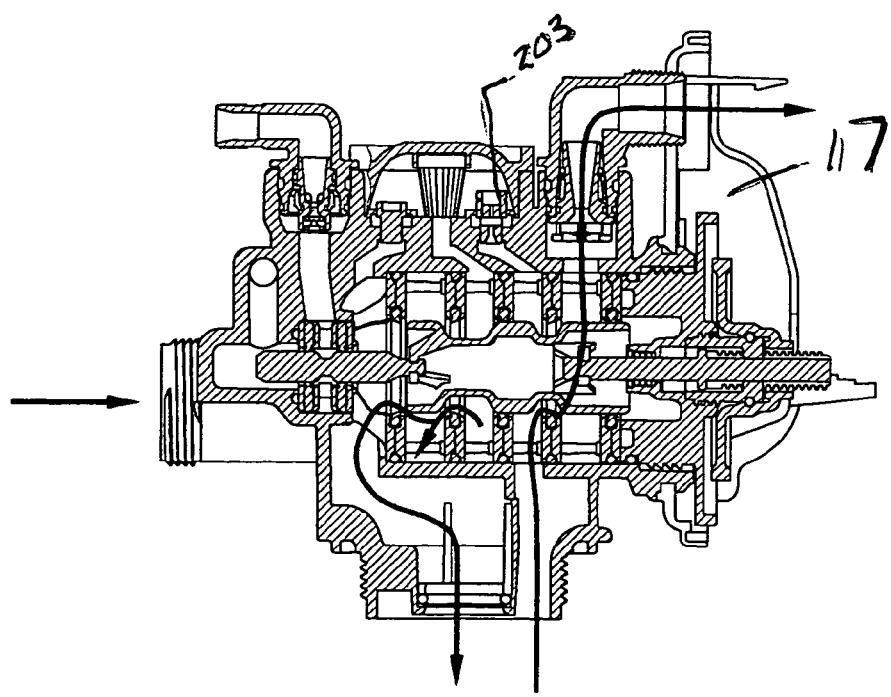
FIG. 10 is an illustrative sectional view of one form of a control valve in a backwashing cycle comprising a portion of a water treatment system.

The flow path in FIG. 8 corresponds to flow through the valve in a fill cycle. FIG. 9 illustrates the flow path through the valve corresponding to the filtering cycle. With reference to FIG. 10, there is illustrated a flow path corresponding to a backwashing cycle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. A water treatment system, comprising:
   a tank having a top and a bottom;
   a control valve located at said top and in fluid communication with said tank, said control valve including a source water inlet adapted to be coupled to a source of water, a drain outlet, a treated water outlet and an air inlet, said air inlet is in fluid flow communication with a venturi disposed within said control valve, said control valve operable to control the passage of fluids between said inlets and outlets and said tank, said control valve controlling the flow of source water through said venturi to draw air through said air inlet and into said tank independently of the passage of treated water from said treated water outlet;
   a fluid flow connection disposed in the tank and in fluid communication with said inlets and outlets, the fluid flow connection operable to convey fluids in two directions; and
   a one way valve in fluid communication with said air inlet, said one way valve allowing the introduction of air to said air inlet.

2. The system of claim 1, wherein said control valve is operable to control a plurality of water treatment cycles, and wherein said plurality of water treatment cycles including a filtering cycle, a backwashing cycle and an air induction cycle.

3. The system of claim 2, wherein said control valve is a programmable device that allows the adjustment of the sequence and timing of a plurality of water treatment cycles.

4. The system of claim 1, which further includes a pair of fluid flow passageways disposed in fluid communication between said control valve and said tank, wherein one of said pair of fluid flow passageways having a fluid flow inlet or outlet proximate said top and the other of said pair of fluid flow passageways having an inlet or outlet proximate said bottom.

5. The system of claim 4, which further includes a medium within a portion of said tank, and wherein said other of the pair of fluid flow passageways has said inlet or outlet within said medium.

6. The system of claim 1, wherein said tank has a diameter within a range of six inches to twenty-four inches;
   which further includes a filtration medium within said tank;
   which further includes a pair of fluid flow passageways disposed in fluid communication between said control valve and said tank, wherein one of said pair of fluid flow passageways having a fluid flow inlet or outlet proximate said top and the other of said pair of fluid flow passageways having an inlet or outlet proximate said bottom, wherein said other of the pair of fluid flow passageways has said inlet or outlet within covered by said medium; and
   wherein said control valve is a programmable device that allows the adjustment of the sequence and timing of a plurality of water treatment cycles.

7. The system of claim 6, wherein said plurality of water treatment cycles including a filtering cycle, a backwashing cycle and an air induction cycle; and
wherein said filtration medium including manganese dioxide-coated pumicite and an aluminum silicate.

8. The system of claim 6, wherein said plurality of water treatment cycles including a filtering cycle, a backwashing cycle and an air induction cycle;
wherein said filtration medium including a plurality of copper-zinc granules and an activated carbon operable to develop catalytic functionality.

9. The system of claim 1, wherein the water treatment system is a single stage iron filter system.

10. The system of claim 1, wherein the water treatment system is a single stage sulfur filter system.

11. The system of claim 1, which further includes a second tank in fluid communication with said tank through said treated water outlet, said second tank having a top and a bottom;
which further includes a filtration medium within said second tank;
which further includes a support bed within said second tank, wherein said support bed is generally disposed beneath said filtration medium;
which further includes a pair of fluid flow passageways disposed in fluid communication with said tank, wherein one of said pair of fluid flow passageways having a fluid flow inlet or outlet proximate said top and the other of said pair of fluid flow passageways having an inlet or outlet proximate said bottom, wherein said other of the pair of fluid flow passageways has said inlet or outlet within covered by said medium; and
wherein said control valve is a programmable device that allows the adjustment of the sequence and timing of a plurality of water treatment cycles.

12. The system of claim 11, which further includes a second control valve located at said top of and in fluid communication with said second tank, said control valve including a source water inlet adapted to be coupled to a source of water, a drain outlet, and a treated water outlet, wherein said second control valve is operable to control the passage of fluids between said inlets and outlets and said second tank.

13. The system of claim 12, wherein said second tank is operable as a backwashing filtration system;
wherein said filtration medium in said second tank including manganese dioxide-coated pumicite and an aluminum silicate.

14. The system of claim 11, which further includes a support bed within said tank; and
which further includes a pair of fluid flow passageways disposed in fluid communication between said control valve and said tank, wherein one of said pair of fluid flow passageways having a fluid flow inlet or outlet proximate said top and the other of said pair of fluid flow passageways having an inlet or outlet proximate said bottom, wherein said other of the pair of fluid flow passageways has said inlet or outlet covered by said media.

15. The system of claim 14, wherein the water treatment system is operable as a dual stage water treatment system.

16. A water treatment system, comprising:
a mechanical housing having an interior volume for holding fluids, said mechanical housing having a top and a bottom; and
a valving mechanism coupled at said top of the mechanical housing and disposed in flow communication with said interior volume, said valving mechanism including a source water inlet adapted to be coupled to a source of water, a drain outlet, a treated water outlet for the passage of treated water therefrom and an air inlet, said air inlet is in flow communication with a venturi within said valving mechanism, said valving mechanism being operable to control the flow of source water through said venturi to draw air through said air inlet and into said tank independently of the passage of treated water from said treated water outlet.

17. The system of claim 16, wherein said valving mechanism is operable to control a plurality of water treatment cycles, and wherein said plurality of water treatment cycles including a filtering cycle, a backwashing cycle and an air induction cycle.

18. The system of claim 17, wherein said valving mechanism is a programmable valve capable of the adjustment of the sequence and timing of the plurality of water treatment cycles.

19. The system of claim 16 which further includes a filtration medium within said mechanical housing;
which further includes a support bed within said mechanical housing, wherein said support bed is generally disposed beneath said filtration medium; and
which further includes a pair of fluid flow passageways disposed in fluid communication between said valving mechanism and said mechanical housing, wherein one of said pair of fluid flow passageways having a fluid flow inlet or outlet proximate said top and the other of said pair of fluid flow passageways having an inlet or outlet proximate said bottom, wherein said other of the pair of fluid flow passageways has said inlet or outlet covered by at least one of said media.

20. The system of claim 16, which further includes means for preventing the discharge of water from said air inlet.

21. The system of claim 16, which further includes a second mechanical housing in fluid communication with said mechanical housing through said treated water outlet, said second mechanical housing having a top and a bottom;
which further includes a filtration medium within said second mechanical housing;
which further includes a support bed within said second mechanical housing, wherein said support bed is generally disposed beneath said filtration medium;
which further includes a pair of fluid flow passageways disposed in fluid communication with said mechanical housing, wherein one of said pair of fluid flow passageways having a fluid flow inlet or outlet proximate said top and the other of said pair of fluid flow passageways having an inlet or outlet proximate said bottom, wherein said other of the pair of fluid flow passageways has said inlet or outlet within covered by at least one of said media; and
wherein said valving mechanism is a programmable device that allows the adjustment of the timing and sequence of a plurality of water treatment cycles.

22. A water treatment system, comprising:
a tank having a top and a bottom;
a programmable control valve disposed in fluid communication with said tank, said control valve including a source water inlet adapted to be coupled to a source of water, a drain outlet, a treated water outlet and an air inlet, said air inlet is in fluid flow communication with a venturi disposed within said control valve, said control valve operable to control the passage of fluids between said inlets and outlets and said tank, said control valve controlling the flow of source water through said venturi to draw air through said air inlet and into said tank independently of the passage of treated water from said treated water outlet;

a fluid flow connection disposed in the tank and in fluid communication with said inlets and outlets, the fluid flow connection operable to convey fluids in two directions; and a one way valve in fluid communication with said air inlet, said one way valve allowing the introduction of air to said air inlet.

23. The system of claim 22, wherein said programmable control valve allows the adjustment of the sequence and timing of a plurality of water treatment cycles.

24. The system of claim 1, wherein said control device is an electronic programmable device.

25. The system of claim 1, which further includes a filtration medium within said tank;

which further includes a support bed within said tank, wherein said support bed is generally disposed beneath said filtration medium;

which further includes a pair of fluid flow passageways disposed in fluid communication between said control valve and said tank, wherein one of said pair of fluid flow passageways having a fluid flow inlet or outlet proximate said top and the other of said pair of fluid flow passageways having an inlet or outlet proximate said bottom, wherein said other of the pair of fluid flow passageways has said inlet or outlet within covered by said medium; and wherein said control valve is a programmable device.

26. A water treatment system, comprising:

a mechanical housing having an interior volume for holding fluids, said mechanical housing having a top and a bottom; and a valving mechanism coupled with the mechanical housing and disposed in flow communication with said interior volume, said valving mechanism including a source water inlet adapted to be coupled to a source of water, a drain outlet, a treated water outlet for the passage of treated water therefrom and an air inlet, said air inlet is in flow communication with a venturi within said valving mechanism, said valving mechanism being operable to control the flow of source water through said venturi to draw air through said air inlet and into said tank independently of the passage of treated water from said treated water outlet.

27. The system of claim 26, wherein said valving mechanism is a programmable valve capable of the adjustment of at least one of the sequence and timing of the plurality of water treatment cycles.

* * * * *